(12) United States Patent
Haruna et al.

(10) Patent No.: US 7,130,513 B2
(45) Date of Patent: Oct. 31, 2006

(54) GLASS-BODY-PRODUCING METHOD AND OPTICAL GLASS BODY AND OPTICAL FIBER

(75) Inventors: Tetsuya Haruna, Yokohama (JP); Shinji Ishikawa, Yokohama (JP); Toshiki Taru, Yokohama (JP); Tetsutarou Katayama, Yokohama (JP); Nobuyuki Taira, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/141,203

(22) Filed: Jun. 1, 2005

(65) Prior Publication Data

US 2005/0276555 A1 Dec. 15, 2005

(30) Foreign Application Priority Data

Jun. 2, 2004 (JP) ............................. 2004-164353

(51) Int. Cl.
G02B 6/02 (2006.01)
(52) U.S. Cl. ....................... 385/123; 65/399; 65/426
(58) Field of Classification Search ................ 65/384, 65/390, 399, 417, 426; 385/123
See application file for complete search history.

(56) References Cited

U.S. PATENT DOCUMENTS

| | | | | |
|---|---|---|---|---|
| 4,787,927 A * | 11/1988 | Mears et al. | ................ | 65/390 |
| 4,826,288 A | 5/1989 | Mansfield et al. | ............ | 65/390 |
| 5,961,682 A | 10/1999 | Lee et al. | ...................... | 65/384 |
| 6,474,106 B1 * | 11/2002 | Crossland et al. | ............ | 65/377 |
| 7,003,984 B1 * | 2/2006 | Soufiane | ...................... | 65/418 |

FOREIGN PATENT DOCUMENTS

EP 0 196 665 10/1986
JP 63315530 A * 12/1988

OTHER PUBLICATIONS

Tumminelli et al., "Fabrication of High-Concentration Reare-Earth Doped Optical Fibers Using Chelates" Journal of Lightwave Technology, IEEE, New York, US, vol. 8, No. 11, Nov. 1, 1990, pp. 1680-1683, XP 000174437.
Tumminelli, Richard., et al. "Fabrication of High-Concentration Rare-Earth Doped Optical Fibers Using Chelates." Journal of Lightwave Technology, vol. 8, No. 11, Nov. 1999, pp. 1680-1683.
"Tentative production of rare earth doped silica fiber." No. 20 Poster Presentation, 4th Symposium of Advanced Photon Processing and Measurement Technology, Nov. 22, 2000 (w/Partial English translation).

* cited by examiner

Primary Examiner—Sung Pak
Assistant Examiner—Daniel Petkovsek
(74) Attorney, Agent, or Firm—McDermott Will & Emery LLP

(57) ABSTRACT

A method produces a glass body that contains a reduced amount of OH groups in the metallic-oxide-containing glass layer and that has a reduced amount of transmission loss due to OH groups when the glass body is transformed into an optical fiber. The production method produces an optical glass body. An optical fiber contains the optical glass body in at least one part of its region for guiding a lightwave. The production method includes the following steps: (a) introducing into a glass pipe a gas containing an organometallic compound and a glass-forming material; (b) decomposing the organometallic compound into an organic constituent and a metallic constituent; (c) heating and oxidizing the metallic constituent so that produced glass particles containing a metallic oxide are deposited on the inner surface of the glass pipe to form a glass-particle-deposited layer; and (d) consolidating the deposited layer to form a metallic-oxide-containing glass layer.

9 Claims, 4 Drawing Sheets

GLASS-BODY-PRODUCING METHOD AND OPTICAL GLASS BODY AND OPTICAL FIBER

BACKGROUND OF THE INVENTION

1. Field of the Invention

The present invention relates to a method of producing a glass body and to an optical glass body produced by this method and to an optical fiber.

2. Description of the Background Art

The modified chemical vapor deposition (MCVD) process is known as a method of producing silica glass to be used as an optical glass body. FIGS. 5A and 5B are conceptual diagrams of the MCVD process. FIG. 5A shows a step for synthesizing glass, and FIG. 5B shows a step for collapsing a glass pipe. In the glass-synthesizing step, a material gas, such as an $SiCl_4$ gas, and an $O_2$ gas are introduced into a glass pipe 1. The glass pipe 1 is heated with a heat source 4 placed at the outside of the glass pipe 1 so as to be movable. The heating causes the material gas to react with the $O_2$ gas. The reaction produces glass particles composed of $SiO_2$ and others. The glass particles are deposited on the inner surface of the glass pipe 1 to form a glass-particle-deposited layer 2. The glass-particle-deposited layer 2 is further heated by the moving heat source 4 and is consolidated to become a synthesized glass layer 3.

In the case of an example shown in FIG. 5A, a $GeCl_4$ gas is also introduced into the glass pipe 1 so that the synthesized-glass layer 3 can be doped with $GeO_2$ to adjust the refractive index. Alternatively, only the glass-particle-deposited layer may be formed in this step by controlling the degree of the heating at the glass-synthesizing step. In this case, the consolidation of the layer is performed in a separate step. The glass pipe 1 having the formed synthesized-glass layer 3 therein is heated by the heat source 4 placed at the outside and is collapsed to become a glass body having a bar shape (see FIG. 5B).

An optical waveguide made with silica glass doped with a rare-earth element such as Er can be used as an amplifier, because when it is shone by an intense incident lightwave of short wavelength, electrons of the ions of the rare-earth element are excited to exhibit an amplifying phenomenon due to stimulated emission. An amplifier incorporating an erbium-doped fiber (EDF) is advantageous in that it is easily connected to a fiber for optical transmission and it has small polarization dependency of the amplification degree. The MCVD process is also used as a method of producing such an optical glass body doped with a rare-earth element.

A method of producing an EDF has been proposed by U.S. Pat. No. 4,826,288 and a literature written by Richard P. Tumminelli et al., (Journal of Lightwave Technology, Vol. 8, pp. 1680–1683). In the proposed method, a glass material gas (such as $SiCl_4$), an $Al_2Cl_6$ or $AlCl_3$ gas, and a gas of a chelate compound containing a rare-earth element are transported into a glass pipe with individually separated pipes to be mixed directly before the glass-synthesizing reaction begins. In the method, the glass pipe is heated with a ribbon burner so that the chelate compound will not solidify before reaching the point where the glass-synthesizing reaction is produced by the heating with an oxy-hydrogen burner.

In the above-described method, the chelate compound gas is supplied to the point where the glass-synthesizing reaction occurs. Consequently, much of the water vapor derived from the chelate compound remains in the glass containing the rare-earth oxide (the glass containing the metallic oxide). This causes a problem that the produced fiber has high optical-absorption peaks at 1.24 μm and 1.38 μm due to the vibration of OH groups. The literature written by Richard P. Tumminelli et al. states at the sixth line from the bottom of the left column on page 1682 that the Nd-doped glass has an OH-group content between 15 and 20 ppm.

SUMMARY OF THE INVENTION

An object of the present invention is to offer a method of producing a glass body that contains a reduced amount of OH groups in the metallic-oxide-containing glass layer and that has a reduced amount of increment in transmission loss due to OH groups when the glass body is transformed into an optical fiber.

To attain the foregoing object, the present invention offers a method of producing a glass body comprising a metallic-oxide-containing glass layer. The method includes the following steps:

(a) introducing into a glass pipe a gas containing an organometallic compound and a glass-forming material;

(b) decomposing the organometallic compound into an organic constituent and a metallic constituent;

(c) heating and oxidizing the metallic constituent so that produced glass particles containing a metallic oxide are deposited on the inner surface of the glass pipe to form a glass-particle-deposited layer; and (d) consolidating the deposited layer to form a metallic-oxide-containing glass layer.

According to another aspect of the present invention, the present invention offers an optical glass body produced by a method of producing a glass body of the present invention. According to yet another aspect of the present invention, the present invention offers an optical fiber containing the foregoing optical glass body in at least one part of its region for guiding a lightwave.

Advantages of the present invention will become apparent from the following detailed description, which illustrates the best mode contemplated to carry out the invention. The invention can also be carried out by different embodiments, and their details can be modified in various respects, all without departing from the invention. Accordingly, the accompanying drawing and the following description are illustrative in nature, not restrictive.

BRIEF DESCRIPTION OF THE DRAWING

The present invention is illustrated to show examples, not to show limitations, in the figures of the accompanying drawing. In the drawing, the same reference signs and numerals refer to similar elements.

In the drawing:

FIGS. 5A and 5B are conceptual diagrams of the MCVD process, in which FIG. 5A shows a step for synthesizing glass and FIG. 5B shows a step for collapsing a glass pipe.

DETAILED DESCRIPTION OF THE INVENTION

Figure 1:
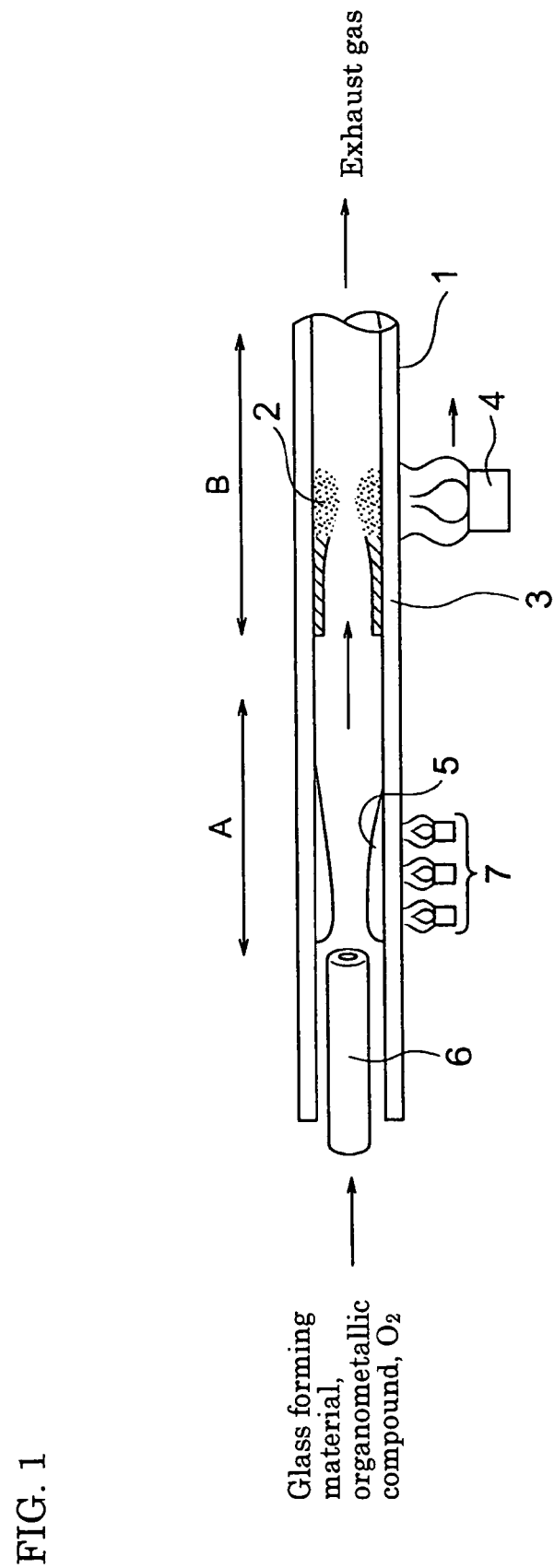
FIG. 1 is a conceptual diagram showing the first embodiment of a method of producing a glass body according to the present invention.

The present inventors found that a metallic-oxide-containing glass layer containing an extremely reduced amount of OH groups can be formed by decomposing an organometallic compound gas into an organic constituent and a metallic constituent before the glass-synthesizing reaction to transport only the metallic constituent to the region for the glass-synthesizing reaction.

A method of producing a glass body of the present invention forms a metallic-oxide-containing glass layer by the following steps:

(1) introducing into a glass pipe a glass-forming material gas, an organometallic compound gas, a carrier gas, a reactive gas such as $O_2$ (the reactive gas may also act as the carrier gas), and so on;

(2) heating the glass pipe from outside, so that glass particles produced by a gas-phase reaction in the glass pipe are deposited on the inner surface of the glass pipe to form a glass-particle-deposited layer; and (3) consolidating the deposited layer to form a metallic-oxide-containing glass layer.

During the foregoing steps, the organometallic compound undergoes decomposition into an organic constituent and a metallic constituent at a position upstream from the region where the gas-phase reaction occurs, so that the organic constituent is subjected to a condensation reaction and is deposited at that position. In the region where the glass-synthesizing reaction occurs, the metallic constituent is heated and oxidized to produce glass particles containing a metallic oxide.

The types of the glass-forming material gas include $SiCl_4$, ester silanes expressed as $R_nSi(OR')_{4-n}$ (here, R represents a hydrogen atom, a methyl group, or an ethyl group, R' represents a methyl group or an ethyl group, and "n" represents a non-negative integer from 0 to 4), and $Al_2Cl_6$. As a material gas for an additive to adjust the refractive index, the following gases, for example, may be used: $GeCl_4$, $BCl_3$, $BBr$, $POCl_3$, $SiF_4$, $BF_3$, $Ge(OR'')_4$, and $B(OR'')_3$ (here, R'' represents a univalent hydrocarbon group). The glass-forming material gas and the material gas for an additive to adjust the refractive index are usually introduced into the glass pipe together with the carrier gas by bubbling. The types of the carrier gas include $H_2$, Ar, Helium, and air. An $O_2$ gas may be used as the carrier gas.

The types of the organometallic compound include a compound with a metal, such as Li, Na, Be, Mg, Al, Cu, Zn, Cd, Ga, Sc, Y, Ti, Zr, Hf, Bi, Pb, and Ta, or with a ligand of a rare-earth metal, such as Ce, Eu, Gd, Dy, Er, Tm, and Yb. The types of the ligand include 1,1,1-trifluoro-2,4-pentanedione (trifluoroacetylacetone); 1,1,5,5,5-hexafluoro-2,4-pentanedione (hexafluoroacetylacetone (abbreviated to "hfa")); 2,2,6,6-tetramethyl-3,5-heptanedione (abbreviated to "thd"); 1,1,1,2,2,3,3-heptafluoro-7,7-dimethyl-4,6-octanedione; 2,2,7-trimethyl-3,5-octanedione; 1,1,5,5,6,6,7,7,7-decafluoro-2,4-heptanedione; 1,1,1-trifluoro-6-methyl-2,4-heptanedione; 1,1,1-trifluoro-5,5-dimethyl-2,4-hexanedione; acetylacetone (abbreviated to "AcAc"); and dipivaloylmethane (abbreviated to "DPM").

The organometallic compound is required to be one whose organic constituent do not gasify when it is decomposed into an organic constituent and a metallic constituent. When erbium is used as the metal, it is desirable to use $Er(DPM)_3$ or $Er(AcAc)_3$, for example. In particular, it is desirable to use $Er(DPM)_3$ expressed by the following structural formula.

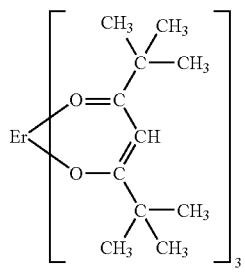

The types of the organometallic compound containing another metal than a rare earth include $Pb(DPM)_2$ and $Bi(DPM)_3$. These organometallic compounds are sublimated by heating to be introduced into the glass pipe together with other gases.

FIG. 1 is a conceptual diagram showing the first embodiment of a method of producing a glass body according to the present invention. A gas containing a glass-forming material gas, an organometallic compound gas, and the like is introduced into a glass pipe 1 through a gas-feeding pipe 6. The introduced gas is heated in a region indicated by "A" with a heat source (an oxy-hydrogen burner 7) to a temperature at which the organometallic compound is thermally decomposed without being oxidized. As a result, the organic constituent 5 is removed from the mixed gas by being deposited in the glass pipe 1. Only the metallic constituent is supplied to a region indicated by "B" together with the glass-forming material gas and others. The metallic constituent is heated with a heat source 4 to a temperature at which it undergoes an oxidizing reaction to form glass particles. The glass particles form a glass-particle-deposited layer 2 containing a metallic oxide. The layer is then consolidated to become a synthesized-glass layer 3 (a metallic-oxide-containing glass layer 3).

The region "A" is located in the vicinity of the gas-ejecting orifice of the gas-feeding pipe 6. The region is required to have a sufficient length so that the organometallic compound can be decomposed and then the organic constituent can be removed by deposition. The flow rate of the gas from the gas-feeding pipe 6 is predetermined to be a degree such that the decomposing reaction of the organometallic compound and the deposition of the organic constituent to the glass pipe 1 can be sufficiently performed within the region "A." For example, it is desirable to employ a flow rate of 400 to 3,000 standard cubic centimeter (sccm). The desirable gas flow rate depends on the inner diameter of the pipe. The heat source 4 moves relatively against the glass pipe 1. Therefore, either the heat source 4 or the glass pipe 1 may be moved. As the heat source 4, an oxy-hydrogen burner and other external heat sources usually used in the MCVD process may be used without particular limitation.

The heat source is not limited to the oxy-hydrogen burner 7 providing that it can heat to a temperature range at which the organometallic compound decomposes and no oxidizing reaction occurs. It is desirable that the heating temperature by the heat source be at least 100° C. and at most 1,000° C., more desirably at least 200° C. and at most 600° C. As subsequent steps, a collapsing step, an elongating step, a drawing step, and other steps may be added as deemed appropriate, which are usually performed to obtain an intended optical glass body, such as an optical fiber preform and an optical fiber.

Figure 2:
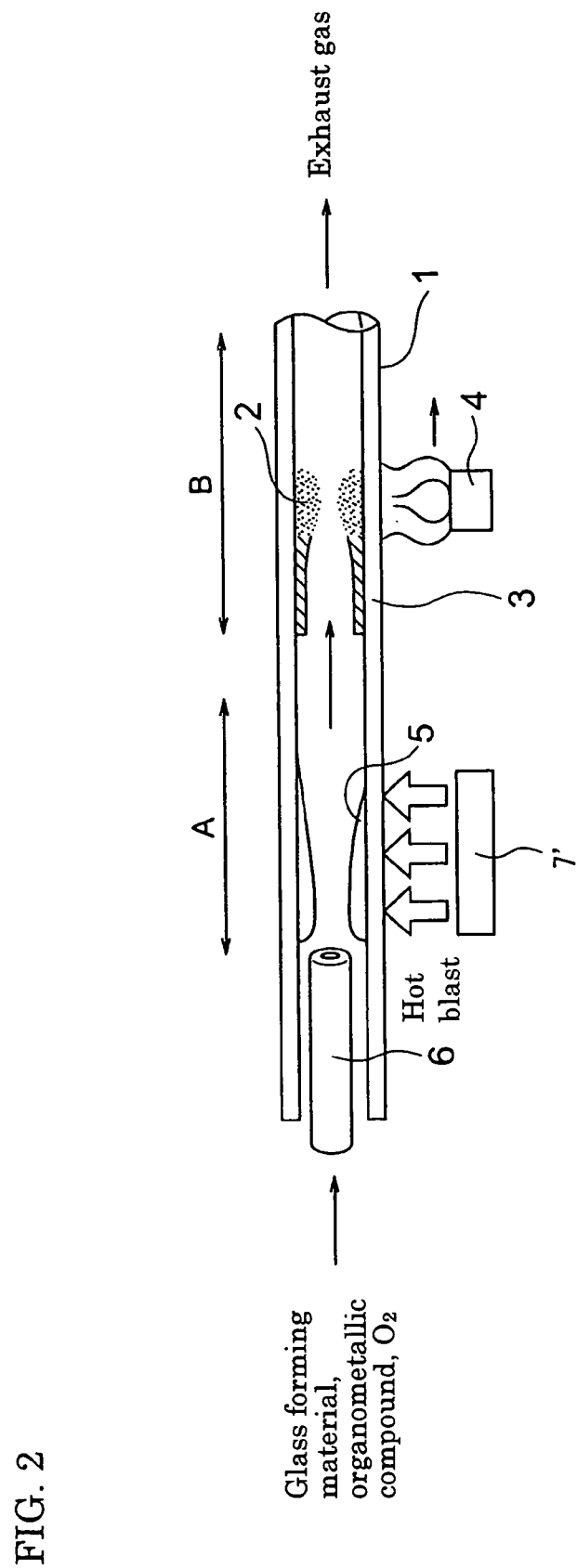
FIG. 2 is a conceptual diagram showing the second embodiment of a method of producing a glass body according to the present invention.

FIG. 2 is a conceptual diagram showing the second embodiment of a method of producing a glass body according to the present invention. This method is the same as that shown in FIG. 1, except that a heater 7' is used as the heat source and the inside of the glass pipe is heated to an intended temperature by blowing a hot air to the region "A." The hot air may be blown either from directly below the glass pipe 1 or along the glass pipe 1. The blowing method has no particular limitation. In order to increase the heat transfer to the inner surface of the glass pipe 1, it is desirable to employ a heat-efficiency-improving means such as the surrounding of the heating zone of the region "A" with a metallic enclosure.

Figure 3:
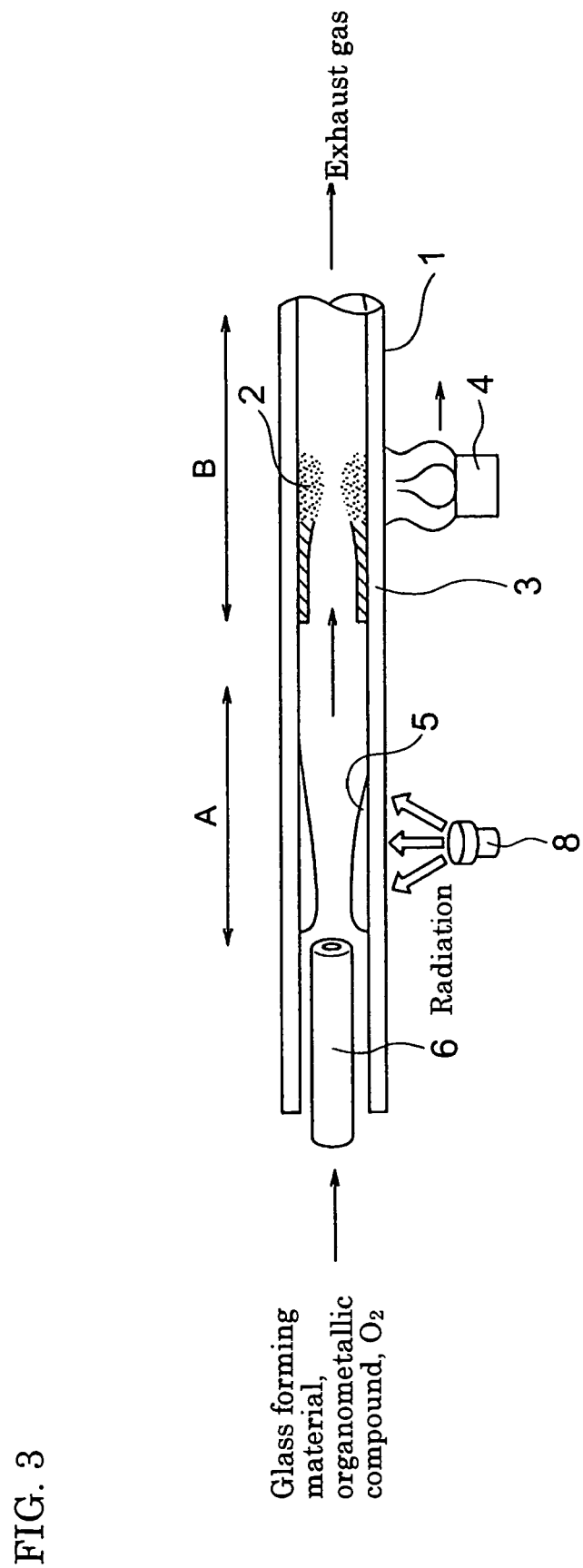
FIG. 3 is a conceptual diagram showing the third embodiment of a method of producing a glass body according to the present invention.

FIG. 3 is a conceptual diagram showing the third embodiment of a method of producing a glass body according to the present invention. This method is the same as that performed by thermal decomposition as shown in FIGS. 1 and 2, except that the heat source is replaced with a light source 8 and the decomposition of the organometallic compound in the region "A" is performed by photodecomposition by the irradiation of light. As the light source 8, an ultraviolet lamp, a halogen lamp, and a mercury lamp may be used, for example. It is desirable that the light for the irradiation have a wavelength of 200 to 600 nm.

The decomposition of the organometallic compound may be performed by both thermal decomposition and photodecomposition by using the heat source and the light source 8 concurrently. Although FIGS. 1 to 3 show methods in which the glass-particle-depositing step and the consolidating step are performed concurrently, these steps may be separated. In this case, in the consolidating step, a gas containing $Cl_2$ and the like for dehydration may be fed to further reduce the content of OH groups.

Figure 4:
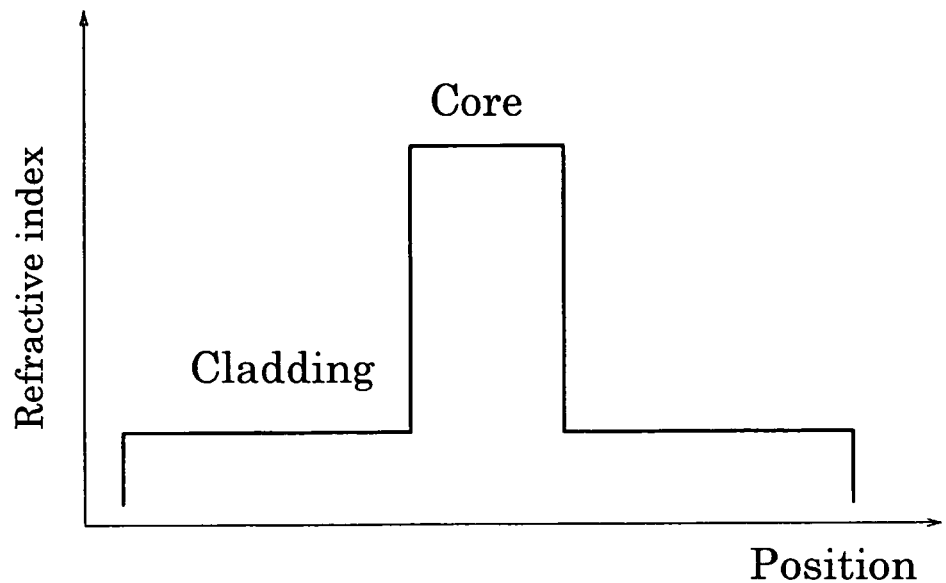
FIG. 4 is a diagram showing the refractive-index profile of an embodiment of an optical fiber of the present invention.
Figure 5A:
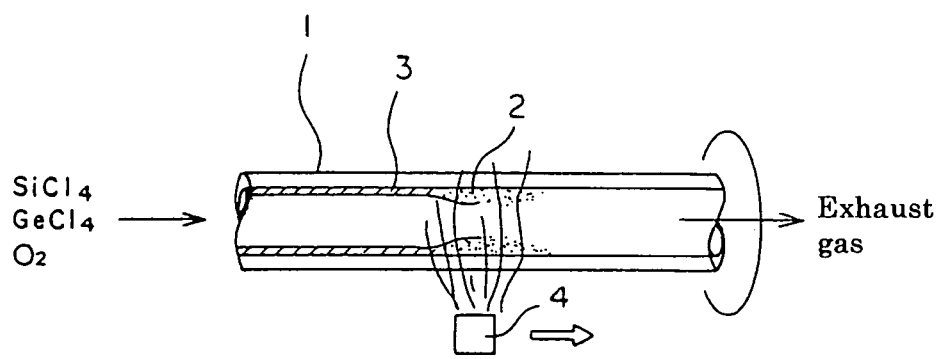
Figure 5B:
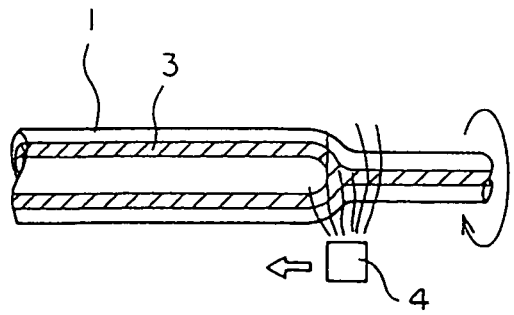

A glass body produced by a method of the present invention can be used suitably as an optical glass body. The content of OH groups in the metallic-oxide-containing glass layer in the glass body can be reduced to at most 10 ppm or even to at most 1 ppm. The low content enables the production of optical glass bodies having low optical transmission loss due to the vibration of OH groups. More specifically, the optical glass bodies are an optical fiber preform, an intermediate of an optical fiber preform, and the like and optical fibers produced through them. FIG. 4 is a diagram showing the refractive-index profile of an embodiment of an optical fiber of the present invention produced by using a chelate compound of a rare-earth element. In an optical fiber, it is desirable that a metallic-oxide-containing glass layer be included in at least one part of the core.

EXAMPLE

Optical glass bodies were produced by the method of producing a glass body according to the above-described embodiments. Gases whose types and amounts are shown in Table were introduced into the glass pipe 1 through the gas-feeding pipe 6 and mixed in the glass pipe 1.

TABLE

| | Example No. | | | | |
|---|---|---|---|---|---|
| | 1 | 2 | 3 | 4 | 5 |
| $SiCl_4$ sccm | 65 | 65 | 40 | 40 | 40 |
| $GeCl_4$ sccm | 0 | 0 | 0 | 36 | 0 |
| $POCl_3$ sccm | 0 | 0 | 55 | 0 | 0 |
| $BCl_3$ sccm | 0 | 0 | 0 | 5.0 | 0 |
| $AlCl_3$ sccm | 20 | 20 | 0 | 0 | 12 |
| $Er(DPM)_3$ sccm | 0.12 | 0.12 | 0.12 | 0.12 | 0.12 |
| $Y(DPM)_3$ sccm | 0 | 0 | 0 | 0 | 2.50 |
| $O_2$ sccm | 2,700 | 1,700 | 1,700 | 1,200 | 1,200 |
| He sccm | 600 | 200 | 1,200 | 300 | 300 |
| $Cl_2$ sccm | 50 | 200 | 60 | 200 | 200 |
| OH ppm | <0.44 | <0.51 | <1.2 | <0.68 | <0.80 |
| Heating method | Hot air | Burner | Burner | Halogen lamp | Halogen lamp + Burner |
| Decomposing method | Thermal | Thermal | Thermal | Photo | Thermal + Photo |
| Temperature ° C. | 500 | 800 | 1,100 | — | 800 |

In the line of "Decomposing method, "Thermal" and "Photo" represents thermal decomposition and photodecomposition, respectively.

Subsequently, in the region "A," $Er(DPM)_3$ or both of $Er(DPM)_3$ and $Y(DPM)_3$ included in the mixed gas were treated immediately after the introduction from the gas-feeding pipe 6. They were heated by the heating method and at the temperature both shown in Table and/or irradiated with the light source shown in Table to be thermally decomposed and/or photodecomposed, so that their organic constituent was deposited.

The region "B" (the region for the glass-synthesizing reaction) was located at least 300 mm downstream from the gas-ejecting orifice of the gas-feeding pipe 6. In this region, an oxy-hydrogen burner as the heat source 4 was traversed in a range having a length of 500 mm at a speed of 120 mm/min. In Example 1, the surface temperature of the pipe in the region "B" was maintained at 1,900° C. to produce glass particles containing Er, to deposit the glass particles, and to consolidate the deposited layer in the same step. In Examples 2 to 5, the surface temperature of the pipe in the region "B" was maintained at 1,300° C. to only produce and deposit glass particles in the same step. In this case, the consolidation of the glass-particle-deposited layer was performed in a separate step. In this consolidation step, Helium was fed at a rate of 500 sccm, $O_2$ at 500 sccm, and $Cl_2$ at 200 sccm and the surface temperature of the pipe was controlled to fall within a range of 1,000 to 1,600° C.

Subsequently, an optical glass body was produced by collapsing the hollow portion. In Example 3, glass particles were partly produced during the thermal decomposition. In Examples 4 and 5, the halogen lamp produced a lightwave having a wavelength of 360 nm. In each of Examples, the content of OH groups in the metallic-oxide-containing glass layer in the glass body was less than 10 ppm as shown in Table. Furthermore, when the data of Example 3 was omitted, the content was less than 1 ppm.

Comparative Example 1

A metallic-oxide-containing glass layer was formed by introducing $Er(DPM)_3$ so as not to decompose until it reached the region "B" for the glass-synthesizing reaction. A material gas ($SiCl_4$: 20 sccm, $GeCl_4$: 6.5 sccm, $AlCl_3$: 9.0 sccm, and $Er(DPM)_3$: 0.2 sccm) and Helium, $O_2$, and $Cl_2$ were introduced into the glass pipe through the gas-feeding pipe. In order to prevent $Er(DPM)_3$ from solidifying in the glass pipe, the portion from the gas-ejecting orifice of the gas-feeding pipe to the region "B" was maintained hot with a ribbon burner. In the region "B," as with Example 1, an oxy-hydrogen burner was traversed to produce, deposit, and consolidate glass particles containing Er. Subsequently, the hollow portion was collapsed to form an optical glass body. The $Er_2O_3$-containing layer of this glass body had an OH-group content of 6 ppm.

The present invention is described above in connection with what is presently considered to be the most practical and preferred embodiments. However, the invention is not limited to the disclosed embodiments, but, on the contrary, is intended to cover various modifications and equivalent arrangements included within the spirit and scope of the appended claims.

The entire disclosure of Japanese patent application 2004-164353 filed on Jun. 2, 2004 including the specification, claims, drawing, and summary is incorporated herein by reference in its entirety.

What is claimed is:

1. A method of producing a glass body comprising a metallic-oxide-containing glass layer, the method comprising the sequential steps of:
   (a) introducing into a glass pipe a gas containing an organometallic compound and a glass-forming material;
   (b) decomposing the organometallic compound into an organic constituent and a metallic constituent;
   (c) heating and oxidizing the metallic constituent so that produced glass particles containing a metallic oxide are deposited on the inner surface of the glass pipe to form a glass-particle-deposited layer; and
   (d) consolidating the deposited layer to form a metallic-oxide-containing glass layer.

2. A method of producing a glass body as defined by claim 1, wherein the decomposition is thermal decomposition and is performed at a temperature at which the organometallic compound is not oxidized.

3. A method of producing a glass body as defined by claim 2, wherein the temperature is at least 100° C. and at most 1,000° C.

4. A method of producing a glass body as defined by claim 2, wherein the temperature is at least 200° C. and at most 600° C.

5. A method of producing a glass body as defined by claim 2, wherein the decomposition is both thermal decomposition and photodecomposition.

6. A method of producing a glass body as defined by claim 1, wherein the decomposition is photodecomposition.

7. An optical glass body produced by a method of producing a glass body, the method comprising the steps of:
   (a) introducing into a glass pipe a gas containing an organometallic compound and a glass-forming material;
   (b) decomposing the organometallic compound into an organic constituent and a metallic constituent;
   (c) heating and oxidizing the metallic constituent so that produced glass particles containing a metallic oxide are deposited on the inner surface of the glass pipe to form a glass-particle-deposited layer; and
   (d) consolidating the deposited layer to form a metallic-oxide-containing glass layer, wherein the metallic-oxide-containing glass layer has an OH-group content of at most 10 ppm.

8. An optical glass body as defined by claim 7, wherein the metallic-oxide-containing glass layer has an OH-group content of at most 1 ppm.

9. An optical fiber containing in at least one part of its region for guiding a lightwave an optical glass body produced by a method of producing a glass body, the method comprising the sequential steps of:
   (a) introducing into a glass pipe a gas containing an organometallic compound and a glass-forming material;
   (b) decomposing the organometallic compound into an organic constituent and a metallic constituent;
   (c) heating and oxidizing the metallic constituent so that produced glass particles containing a metallic oxide are deposited on the inner surface of the glass pipe to form a glass-particle-deposited layer; and
   (d) consolidating the deposited layer to form a metallic-oxide-containing glass layer.

* * * * *

UNITED STATES PATENT AND TRADEMARK OFFICE
CERTIFICATE OF CORRECTION

PATENT NO. : 7,130,513 B2 Page 1 of 1
APPLICATION NO. : 11/141203
DATED : October 31, 2006
INVENTOR(S) : Tetsuya Haruna et al.

It is certified that error appears in the above-identified patent and that said Letters Patent is hereby corrected as shown below:

Column 8, line 6, change "100° C." to -- 100° C --

Column 8, line 9, change "200° C." to -- 200° C --

Column 8, line 17, after "comprising the" insert -- sequential --

Signed and Sealed this

Twenty-fourth Day of April, 2007

JON W. DUDAS
*Director of the United States Patent and Trademark Office*